United States Patent [19]
Macy

[11] Patent Number: 5,149,344
[45] Date of Patent: Sep. 22, 1992

[54] MULTI-PHASE FLOW AND SEPARATOR
[75] Inventor: Daniel H. Macy, Houston, Tex.
[73] Assignee: Texaco Inc., White Plains, N.Y.
[21] Appl. No.: 694,592
[22] Filed: May 2, 1991
[51] Int. Cl.$^5$ ............................................ B01D 19/00
[52] U.S. Cl. ..................................... 55/167; 55/185;
210/104; 210/119; 210/124; 210/533; 210/188;
166/267
[58] Field of Search ............... 210/104, 119, 124, 188,
210/533, 86; 166/265, 267; 55/166, 167, 185

[56] References Cited
U.S. PATENT DOCUMENTS

| | | | |
|---|---|---|---|
| 1,426,955 | 8/1922 | Carter | 55/166 |
| 1,457,153 | 5/1923 | Elliott | 55/166 |
| 1,758,376 | 5/1930 | Sawyer | 166/267 |
| 2,688,368 | 9/1954 | Rodgers et al. | 166/267 |
| 2,998,096 | 8/1961 | Snipes | 55/166 |
| 3,705,626 | 12/1972 | Glenn, Jr. et al. | 166/267 |
| 4,233,154 | 11/1980 | Presley | 166/267 |
| 4,435,196 | 3/1984 | Pielkenrood | 55/185 |

Primary Examiner—Peter Hruskoci
Assistant Examiner—Robert James Popovics
Attorney, Agent, or Firm—Robert A. Kulason; James J. O'Loughlin; Robert B. Burns

[57] ABSTRACT

A multi-phase separating apparatus for fluid containing a gaseous component. The apparatus includes a first tank which receives a stream of the multi-phase fluid which is to be resolved into discrete components. A second or separating tank positioned at a lower elevation than the first tank, receives a stream of substantially gas-free liquid. Said gas-free multi-liquid stream is conducted through a valved conduit. The latter includes a buoyant element which is displaceable by liquid in the lower tank, to form a barrier to avoid backflow or oscillatory fluid response of said liquid. Liquid accumulated in the lower tank thus maintains said tank in a substantially full condition. Liquid monitors in the separating tank monitor liquid levels and control outflow from the unit.

8 Claims, 1 Drawing Sheet

5,149,344

MULTI-PHASE FLOW AND SEPARATOR

BACKGROUND OF THE INVENTION

In most instances, the production of crude oil from a subterranean reservoir results in the product being carried from the substrate, to the surface in the form of a multi-phase fluid stream. Usually the stream is comprised basically of the crude oil, and natural gas, together with water, which is normally contained in, or has been injected into the reservoir. Depending on the character of the latter, the upflowing production stream will embody varying amounts of reservoir gas. Functionally, the gas forces the stream upwardly, or is merely intermingled with the composite liquid stream to decrease its density and foster upward movement.

When the production stream is removed from an offshore reservoir, it is usually deposited into a separating facility. The latter allows a natural, gravity separation of the various stream elements in accordance with their densities. Such offshore fluid separating installations are typically found on a supporting vessel such as tanker vessels, tension leg platforms, or semisubmersible vessels.

It can be appreciated that such floating marine vessels, when in an offshore body of water, are subjected to an environment in which weather and sea play a major role. Thus, the vessel is frequently rocked with sufficient turbulence that the composite fluid will be sloshed through the separator apparatus tanks.

The problem of production stream separation becomes particularly critical in the instance of a horizontal separating unit. In the latter, the holding tank or tanks are disposed in a generally horizontal arrangement. This type of unit contrasts from a vertical unit which, as the name implies, takes the form of one or more upright tanks characterized by a minimal water/oil interface.

Among the common methods used for suppressing fluid motion within horizontal separators, is to employ some form of baffle or packing. This solution to alleviate or obviate movement has proven to be less than completely effective. For one thing, it seriously compromises the gravity separation mechanism. Further, it tends to reduce the overall magnitude of fluid movement to a cellular motion between the respective baffles. The quiescent liquid volume necessary to permit movement of oil and water droplets is still perturbed and porous baffles tend to set up turbulent and shear motion within the fluid to remix the oil and water.

STATEMENT OF THE INVENTION

Stated briefly, the novel apparatus herein disclosed includes a first or receiving tank, often referred to as a surge tank, into which a stream of a multi-phase production fluid is directed. The fluid comprises, for example, an immiscible emulsion of water and crude oil which further embodies a gaseous component. The flow will normally have been produced from a subterranean reservoir, and will enter the separator in a non-uniform stream.

The surge or upper receiving tank includes a baffle and venting means to remove the gaseous component which first separates from the liquid phase. The surge tank, as the name implies, functions as a liquid surge section when flow rates are non-uniform. Thereafter, the partially gas-free, multi-component liquid stream is conducted by a gravity flow to a second or separating vessel. The liquid stream conducting member which communicates the two vessels, includes a valved conduit having a flow checking valve element operable to regulate downward, unidirectional flow from the surge tank.

The float valve element is upwardly displaceable by liquid in the lower tank, into contact with an annular seat to preclude further flow. The buoyant float valve element thus operates in conjunction with the system's oil level control device to keep the separating tanks fluid filled at all times. The float valve also functions to prevent reverse flow out the top of the separating vessel when the latter is tilted downward at the inlet end, an action that creates a free gas/liquid interface within the vessel.

In the lower, liquid separating vessel, the less dense crude oil will rise to the water's surface by a gravity separation.

To avoid excessive splashing, sloshing or other disturbance in the liquid level, the lower, or separating tank is maintained in full or "fluid packed" condition by regulating the discharge flow rates of both water and crude oil. This is achieved by liquid level sensors, controls, valving and/or pumps, which permit the two liquids to be moved to storage or to a point of further treatment.

It can be appreciated that free gas/liquid surfaces within the lower surge vessel must be avoided to prevent a condition that would promote sloshing, waves and liquid movement throughout the fluid. When the separating tank is "fluid packed" the tank walls tend to exert body forces which overcome dynamic fluid reactions to prevent fluid motion. The density difference between oil and water is sufficiently small that their interface will only slowly respond to the dynamics resulting from overall vessel motion.

Similarly, the more dense water will naturally gravitate through the crude oil to the bottom of the separating tank. Two discrete streams, one of water and one of oil, can thereafter be conducted separately from the separating tank for further treatment.

In view of the above, it is an object of the invention to provide a separator apparatus capable of separating or resolving a multi-phase fluid into its various components in spite of the separator being positioned on a floating or movable base which is subject to undulations by waves, wind, or the like.

Figure 1:
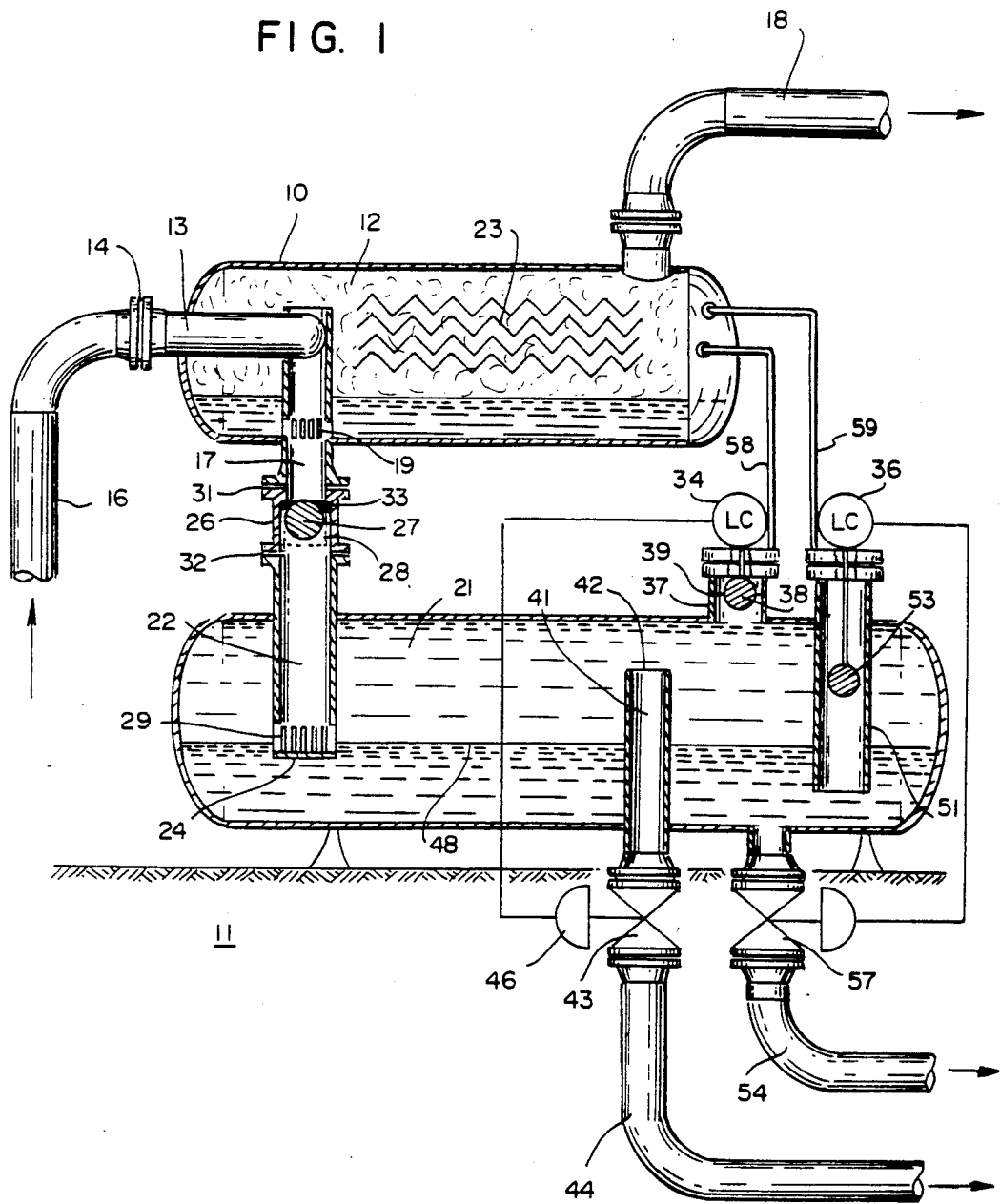
FIG. 1 is an elevation view in cross-section of the subject fluid separating apparatus.

In a preferred embodiment, the multi-phase fluid separating apparatus 10 is illustrated in a generally schematic fashion as it would be supported on a floating vessel 11. The apparatus includes a first or main receiving or surge tank 12 having one or more fluid inlet conductors 13. The latter are comprised of a flange 14 to which a pipeline 16 or other conductor is removably coupled by bolting or similar means. A second or separating tank 21 is positioned beneath receiving tank 12 to allow a controlled, gravity flow of liquid into tank 21.

Pipeline riser 16 will normally extend upwardly from the sea floor, being communicated at its lower end with one or more producing wells not shown. Preferably the pipeline is communicated with a manifold into which a plurality of wells, or the subterranean reservoirs deposit their production stream. The manifold will normally constitute the first point of pressure control for the fluids.

Although the flow of production fluid from the sea floor is normally maintained constant and under gas pressure, it can be varied by use of valving or other means not presently shown.

Pipeline riser 16 can be comprised of a flexible, supported member to allow for a degree of mobility in the surface positioned support vessel 11. In any event, pipeline 16 will conduct a pressured stream of multi-phase production fluid which, as noted, is comprised of one or more liquids carrying varying amounts of a pressurizing gas. Pressure within the respective tanks 12 and 21 is maintained by a pressure control means such as a control valve located upstream of separating apparatus.

At main receiving tank 12, the fluid inlet is comprised, as noted, of external flange 14 having inlet conductor 13 depending therefrom and extending into tank 12. The latter is normally fabricated of steel or other appropriate metal characterized by a sufficient wall thickness to withstand internal pressure, as well as the environmental conditions external to the apparatus.

A gas vent or venting means in tank 12 is comprised primarily of a pipe 18, which is positioned at the upper side of the tank, and which extends through the tank wall to conduct gas therefrom. Said pipe 18 can be vented to the atmosphere or could be communicated with a gas storage facility for collection and commercial sale or use.

A riser 17 in receiving tank 12 stands in a substantially upright disposition and communicates with conductor 13. The conductor 13 to riser 17 connection can incorporate a simple baffle plate or a tangentially connected assembly which promotes liquid separation by centrifugal means and directs the liquids into tank 21 via riser 17. Gases from the multicomponent flow will preferentially pass upward through the open top of riser 17. Substantially all the gas-free liquids are thus deposited in tank 12 to form a pool, in anticipation of the separation process.

Riser 17 will accommodate both liquids from tank 21, as well as residual amounts of gas which may not have separated out. The primary purpose of tank 12 is to separate natural gas from the liquids, as well as to provide liquid surge volume for fluctuating fluid flow. Thereafter, the crude oil water emulsion separation will occur in tank 21.

A baffle section 23, or mist extractor, in tank 12, is similar in structure to corrugated plate packs, or "Chevron Plates", through which the gas flows to dynamically extract liquid mist. Vapors will then rise to exit through vent pipe 18.

Riser 17 is sealably registered in an opening in tank 12 floor and includes openings 19, preferably in the form of slots or the like, through which the substantially gas-free fluid mixture will pass.

Lower or receiving tank 21, as noted, is positioned immediately below upper tank 12. Receiving tank 21 includes a downcomer pipe 22 which terminates at spreader plate 24 located approximately at the oil/water interface 48 level. Said downcomer pipe 22 is provided with a series of discharge ports or passages 29. Liquid from upper tank 12 will thereby enter and mix with the liquid pool in tank 21 creating a minimal degree of turbulence.

Check valve conduit means 26 communicates the respective tanks 12 to 21. Said check valve includes a flow regulating or check valve element 27 which functions to control downward flow of liquid, as well as to avoid reverse or upward liquid flow in the event of tipping or upsetting of the separator unit.

Check valve conduit means 26 includes basically an elongated conductor which sealably engages the ends of pipes 17 and 22 at flanged connectors 31 and 32 having fastening members such as connecting bolts or the like. Said valved conduit means 26 includes basically conductor 28 defining an internal flow passage for flow around the float ball valve element 27. Conductor 28 further embodies a valve assembly, shown partially in the accompanying drawing, but comprised primarily of the float ball valve element 27. The latter is adapted to sealably engage an annular seal 33 to prevent liquid flow from the lower tank 21 into the upper tank 12.

Float valve element 27 is buoyant in the crude oil to respond promptly to any reverse flow which might occur back up into tank 12 triggered by motion of the support vessel 11. Said element 27 is "caged" or movably restrained within its operating range to prevent it being carried into tank 21. The nominal equilibrium position of float valve element 27 is preferably at approximately the same elevation as the elevation of an oil level float control 34 to be hereinafter mentioned.

Normally and operationally, multi-component liquid held in the lower or surge section of upper tank 12, will exit the latter in response to a lowering of liquid level in lower tank 21. Liquid flow through the system of tanks 12 and 21 will be controlled by the coaction oil and water level controllers which concurrently operate respective outlet flow control valves in response to increasing levels of both fluid components.

Regarding regulation of crude oil and water flows from separating tank 21, control thereof is achieved by the combination of flow control valves 43 and 57 which automatically respond to flow controllers or liquid level systems.

As seen in the drawing, tank 21 is provided with two liquid flow controller means 34 and 36.

Crude oil flow passage from separating tank 21 is regulated by a float mechanism or float gauge 34 positioned in a receptacle 37. The latter extends vertically from tank 21 upper wall to define a well in which float mechanism 34 is suspended. Said mechanism is so positioned that the buoyant member 38 extends downwardly to engage and monitor the oil level as the latter adjusts its position within the receptacle.

An oil column 41 positioned in tank 21 transverses the floor of the tank and extending upwardly therefrom having an opening 42 adjacent to, but spaced from, the tank upper wall. Said column 41 is communicated with oil flow control valve 43. The latter in turn is communicated with a pipeline 44 for conducting crude oil flow to a desired processing point. Automatic operation of oil flow control valve 43 is through a control mechanism 46 which is responsive to variations in the oil level as detected by gauge 34.

Functionally, as the oil gauge 34 monitors oil level variations within receptacle 37, said reading will be transformed into a signal to actuate the oil flow valve between closed and open positions. When a sufficient volume of oil has been drained from tank 21, gauge 34 will cause the flow control valve 43 to adjust to closed position.

In a similar manner, a second receptacle 51 formed into the upper wall of tank 21 extends downwardly toward the floor of the latter. Thus, water which has gravitated toward the tank bottom will enter the second column 51 and extend upwardly to a predetermined level.

Said column 51 extends through the upper wall of tank 21 and contains second flow control mechanism 36 having float means 53 to engage and monitor variations in the water level. Control mechanism 36 is communicated to water flow control valve 57 at the tank lower end which is communicated in turn with water pipeline 54. Thus, flow of water from valve 57 will be responsive to the actuation by the float mechanism 36 which monitors the water level in the column.

Because of the gas/oil interface 39, or free surface, at the oil level controller 36, oil level will respond promptly to incoming fluid whether the latter be oil or water, thereby maintaining oil flow control valve in open condition virtually constantly.

Water level controller 36 which may operate at the oil/water interface 48 would be delayed until the water has separated from the incoming mixture to raise this interface level. Hence, there may be some "channeling" of the oil-water mixture through the fluid to the oil outlet, thereby compromising the separation efficiency. This is avoided by changing the water level float controller from a liquid interface type to a gas/water interface level controller as shown. The added benefit will be better float response since the difference in densities of the fluids is now much more pronounced and material selection problems with the float are eliminated. Also, this response to incoming fluid will be immediate and proportional since both oil and water level controllers would promptly activate their respective flow control valves to eliminate "channeling".

Both liquid level monitors 34 and 36 and receptacles therefor will include capillary lines 58 and 59. Said lines are communicated to the gas section of surge tank 12 to prevent gas accumulations being trapped within the respective receptacles, a circumstance which would affect both the interface level elevation, and movement of the liquid surfaces.

It is understood that although modifications and variations of the invention can be made without departing from the spirit and scope thereof, only such limitations should be imposed as are indicated in the appended claims.

I claim:

1. A separator for resolving a multi-phase fluid which includes at least two immiscible liquids having different densities and a gaseous component, said separator being normally subject to an unstable environment which, causes movement of the contained fluids, which apparatus includes:

a receiving tank 12 communicated with a source 16 of the multi-phase fluid to be separated, said receiving tank 12 having means 18 for venting the gaseous component which separates from the liquid phase, a separating vessel 21 positioned at a lower elevation than said receiving tank, valved conduit means 26 communicating said tank 12 with the separating vessel 21 to conduct a gravity flow of substantially gas-free liquid into the separating vessel, said valved conduit means 26 forming a flow passage having an annular seat 33, a float member 27 movably retained in said flow passage, being displaceable by fluid in said tank to engage said annular seat whereby to discontinue liquid flow through the conduit means, and means for discharging discrete flows of said at least two immiscible liquids from said vessel.

2. In the apparatus as defined in claim 1 including flow control means associated with said separating vessel 21 to regulate the discharge of said discreet flows of said at least two immiscible liquids.

3. In the apparatus as defined in claim 2 wherein said flow control mens includes a valve means having valve actuators operably engaging the respective gage means for adjusting the flow rate of said liquids discharging from said separating tank.

4. In the apparatus as defined in claim 1 wherein one of said immiscible liquids is crude oil.

5. In the apparatus as defined in claim 1 including gage means in said separating tank 21 positioned to register the height of the less dense of said two immiscible liquids.

6. In the apparatus as defined in claim 5 including a gas venting conduit communicating said gage means with said receiving tank to conduit residual gas from said separating vessel.

7. In the apparatus as defined in claim 1 including gage means in said separating tank 21 positioned to register the height of the other of said at least two immiscible liquids in said tank 21.

8. In the apparatus as defined in claim 1 including gas venting means communicating said receiving tank with said separating vessel.

* * * * *